Dec. 10, 1929.  G. E. WEAVER ET AL  1,738,622
JACK
Filed July 16, 1927  2 Sheets-Sheet 1
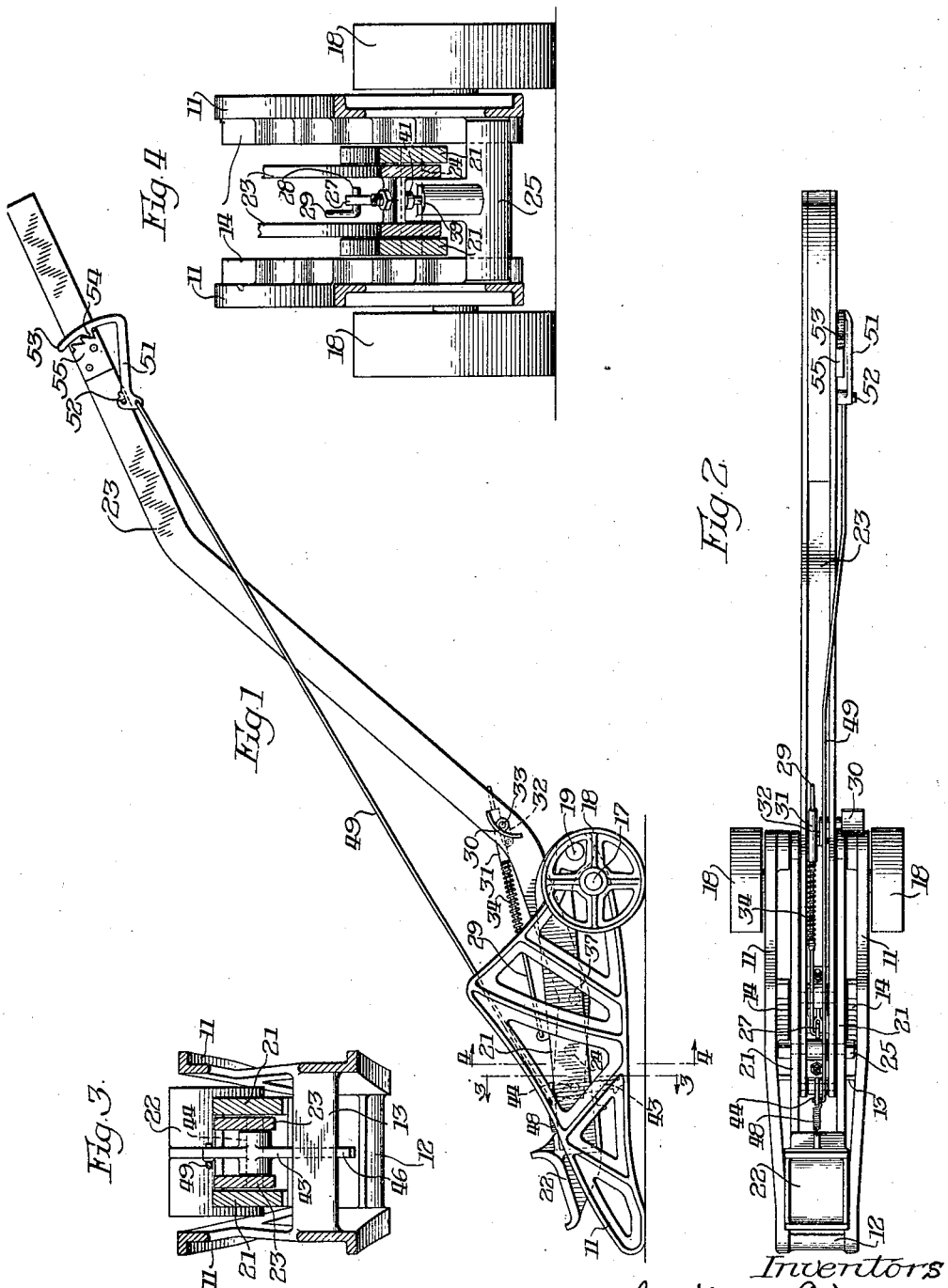
Inventors
Gailard E. Weaver
Edward W. Kelley
By Walter M. Fuller Atty.

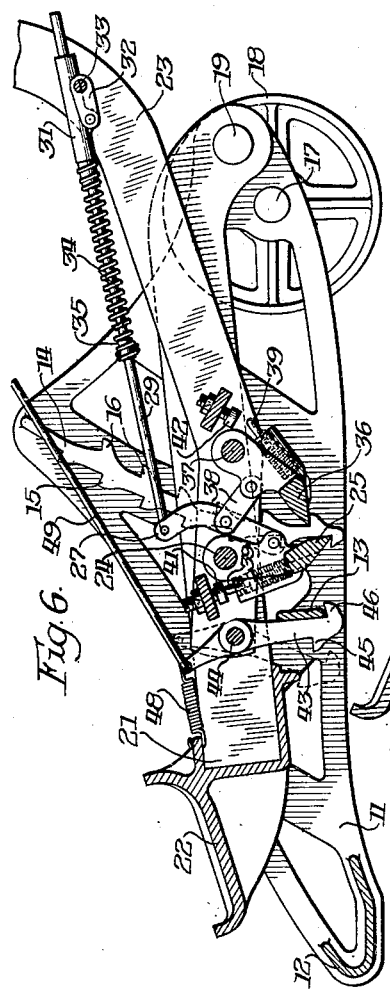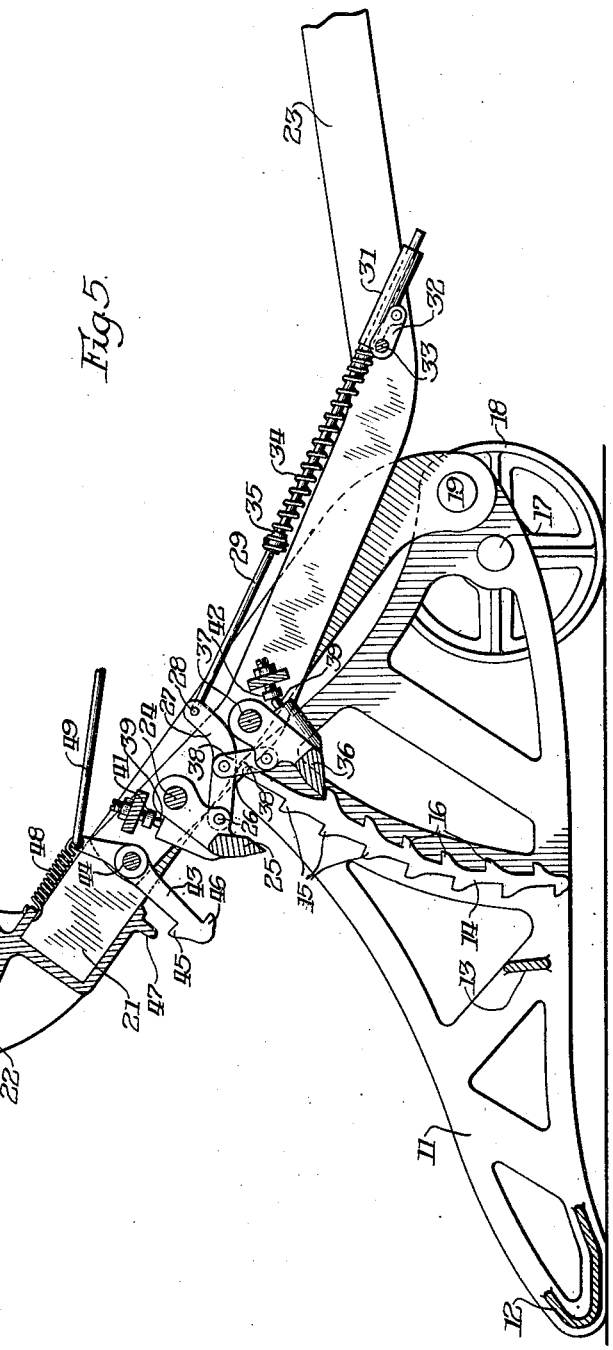

Patented Dec. 10, 1929

1,738,622

UNITED STATES PATENT OFFICE

GAILARD E. WEAVER AND EDWARD W. KELLEY, OF SPRINGFIELD, ILLINOIS, ASSIGNORS TO WEAVER MANUFACTURING COMPANY, OF SPRINGFIELD, ILLINOIS, A CORPORATION OF ILLINOIS

JACK

Application filed July 16, 1927. Serial No. 206,357.

This invention concerns lifting jacks such as are used for raising and lowering a portion of a vehicle to permit the removal or replacement of tire, rim or wheel. It is especially, but not restrictedly, adapted for use with automobiles equipped with the well-known, large-diameter, cross-section balloon-tires, which necessitate that the lifting and lowering portion of the jack shall be able to descend extremely low and to rise a substantial distance due to the fact, that, when a balloon tire becomes deflated, it causes the axle of the car, which is already built quite low, to drop so close to the ground that it is difficult, if not impossible, to place an ordinary jack beneath it and then have sufficient lifting or elevating range to bring the tire clear of the ground so that a new inflated tire may be substituted for the damaged one.

A further aim of the invention is to provide a jack having the capabilities specified, and which can be readily rolled over obstructions and caused to mount sidewalk curbs when not loaded, the appliance as a whole comprising relatively few parts of simple structure, tending to economy in manufacture, as well as sturdiness in action and lack of likelihood of being broken.

To enable those acquainted with this art to fully understand this invention and its several advantages, a present preferred embodiment of the same has been illustrated in the accompanying drawings forming a part of this specification and throughout the several views of which like reference numerals have been employed to designate the same structural elements.

In these drawings,—

Fig. 1 is a side elevation of the new jack;

Fig. 2 is a plan view of the same;

Fig. 3 is an enlarged, vertical cross-section on line 3—3 of Fig. 1, looking toward the front end of the appliance;

Fig. 4 is also an enlarged, vertical cross-section on line 4—4 of Fig. 1, the parts being viewed toward the rear or handle end of the structure;

Fig. 5 is a fragmentary, longitudinal section showing the load-saddle in elevated position; and Fig. 6 is a similar section illustrating the parts in such positions that the handle may raise the front end of the frame from the ground for passing over obstructions, mounting a sidewalk curb, or for ease in positioning the jack beneath the vehicle-axle.

Referring to these drawings, it will be noticed that the appliance includes a cast-metal, open-work frame comprising two, parallel spaced, skeleton side-frames 11, 11 cross-connected together at their front ends by an integral, curved toe-part 12 and at an intermediate point by a vertical web 13, each such side-frame on its inner side and integral therewith having a curved, double ratchet 14 with teeth 15 on its front side and teeth 16 on its back side, the two sets of teeth being staggered with relation to one another, as is clearly shown in Fig. 5, the teeth on the two side-frames, however, being in alignment or register so that a single pawl or dog of adequate width may coact with both simultaneously.

At its rear this main-frame has transverse axle or shaft means 17 equipped, outside of the frame, with a pair of carrying wheels 18, 18, no such wheels or rollers being employed at the front end of the apparatus in order that the load-lifting saddle may be brought to an extremely low position. At their rear ends, these two side-frame support shafts 19 constituting the fulcrum of a double-arm or bifurcated lever or beam 21 fitted at its front end with a load-engaging seat or saddle 22 of appropriate shape to receive and retain the axle or other portion of the vehicle to be elevated.

A long, bifurcated handle 23 is hinged to the lever 21, between its spaced, parallel arms, at 24, and hinged on the same rod or shaft 24 is a lifting dog or pawl 25 of sufficient width and designed to co-operate with both front sets of ratchet teeth 15, such pawl being pivotally connected at 26 to one end of a bent arm 27, the upper or opposite end of which is hinged at 28 to a rod 29 slidable through a bearing member 31 hingedly connected to an arm 32 fixed on a shaft 33 mounted in the parallel bars constituting the handle 23 and extended across the space between them, in which gap the members 31 and 32 are located.

At one side of the handle shaft 33 is a curved, roughened foot-piece 30 (Fig. 1) by means of which the shaft may be readily rocked in the one direction or the other.

A coiled spring 34 encircles the rod 29, its one end being joined to the member 31 in any suitable manner, and its other end being connected to a collar 35 fastened to the rod, whereby when the member 31 is swung rearwardly into the dead-center holding position shown in Fig. 5, the spring will be under tension, and, when rocked forwardly into the opposite, locking, dead-center position depicted in Fig. 6, the spring will be in a state of compression.

A holding dog or pawl 36, of a width equaling that of pawl 25 to enable it to co-operate with both ratchet bars, is hinged to the handle 23, only, on a shaft or pin 37, and is joined to the middle portion of the arm or link 27 by a short connecting link 38, whereby, when the spring 34 is tensioned, as presented in Fig. 5, it tends to separate the two pawls 25 and 36 and to rock them away from their respective parts of the double, stationary ratchet 14, and, when such spring is compressed, as shown in Fig. 6, it tends to cause the pair of pawls to approach one another toward the intervening ratchet-bar.

Each pawl is supplied with a spring-pressed or cushion plunger 39 limited as to the extent of its projection and the two being designed to co-operate with adjustable abutments 41 and 42, respectively, carried by the handle 23.

The front end of handle 23 has a double-hook member 43 hinged thereon at 44 and having oppositely-disposed shoulders or teeth 45 and 46 adapted to engage individually a rib 47 on the bottom of the load lever or under the web 13 of the frame, or such lever may occupy an intermediate position with neither hook located to encounter either of the parts 47 or 13.

The upper end of such double-hook arm is pulled forwardly by a coiled contractile spring 48 connected at one end thereto and mounted at its other end on the load-lever.

A long link 49 connects such top end of the part 43 with the short arm of a bell-crank lever 51 loosely fulcrumed on the handle at 52, the longer arm of the member 51 having a curved upward projection 53 with a tooth 54 adapted to enter any one of the notches of the catch-bar 55 mounted on the handle.

Obviously, the spring 48 will hold the tooth 54 in any of the notches, and, to release such supplemental handle 51, it is merely necessary to force it slightly toward the free end of the handle, which action is rendered possible by the fact that the fulcrum pin 52 occupies a short slot in the handle disposed lengthwise thereof.

The operation of the appliance occurs practically as follows:

Assuming that the jack with its saddle in its lower-most position has been introduced beneath the vehicle-axle, to be elevated, the operator, by grasping the handle and squeezing the little or grip handle upwardly toward such main handle, shifts the lever 43 to bring its tooth or projection 45 directly beneath the rib, thereby, in effect, locking the handle 23 and the load-lever 21 together as a unit, and, thereupon, he presses the handle 23 downwardly, at the same time elevating lever 21 and causing its saddle to ascend quickly until it reaches the load, that is to say, usually the vehicle-axle.

Then the workman releases the grip-handle 51 sufficiently to cause the double-tooth lever to assume its normal or intermediate, inactive position, with its two teeth out of register with the elements with which they might otherwise co-operate.

Thereupon, or previously, the operator with his foot rocks the foot-piece 30 and shifts the associated elements to put the spring 34 under compression, thus causing both pawls 25 and 36 to move toward their common, double ratchet-bar.

Upon depression of the handle 23, the pawl 36, by occupying the corresponding notch of the ratchet-bar, sustains the load and provides a temporarily fixed fulcrum 37 about which the handle turns, and, owing to the direct connection between the handle and load-lever through the pin or shaft 24, the lever 21 and its saddle are correspondingly raised, carrying the load occupying the saddle with it.

Of course, during this movement of the parts, the pawl 25 ascends until it is slightly beyond the next tooth above, whereupon it snaps into position bearing on such tooth and sustains the lever and load while the handle is swung upwardly around its now temporarily-supported and stationary fulcrum 24, carrying the holding pawl 36 up until it bears on the next upper tooth 16.

Then the handle is rocked down, again carrying the load-lever, saddle, load and pawl 25 up another notch, whereupon it is swung up again for the pawl 36 to be in a higher holding position, and, by a sufficient repetition of these movements, the load-lever and load are raised step by step or intermittently the required amount.

To lower the lever, saddle, and its load, the workman shifts the foot-piece 30 to put spring 34 under tension, tending to separate the pair of pawls, such a condition being illustrated in Fig. 5, it being borne in mind that the holding-pawl 36 is not retracted because the load on the saddle and imposed on it prevents the spring from pulling the pawl away from its tooth, all of which teeth, if desired, may be undercut in minor degree.

The handle is then swung up, turning around the now-stationary pin 37, thus lowering the load by reason of its direct connection with the load-lever through the pin 24 until the pawl 25 coacts with the next lower tooth and assumes the load, the abutment 41, through its spring-plunger 39, forcing the pawl into place, whereupon, due to release of the load from pawl 36, the latter, under the action of spring 34, automatically retracts from the tooth with which it has been co-operating.

Then the handle is lowered, while the pawl 25 supports the load, and the pawl 36 comes into engagement with the next lower tooth, being pushed into place by the abutment 42 acting on the spring-plunger 39 sufficiently to overcome the retracting action of spring 34.

Thereupon, while pawl 36 sustains the load, the handle is rocked up again to lower the load another step, as previously, and, thus, by the upward and downward swinging of the handle and the alternate supporting action of the pawls, the load-lever, saddle and load are caused to descend step by step.

When it is desired to lift the front end of the frame off the floor to facilitate rolling of the jack into or from position under the automobile-axle, or to permit its ready rolling up onto the sidewalk curb, the grip-handle 51 is manipulated to cause the tooth 46 to engage beneath the frame cross-web 13, thus locking the handle, load-lever and frame together as a unit, which may be readily tilted around the axle 17 in more or less degree to permit the performance of the intended functions.

Those acquainted with this art will readily understand that the invention as defined by the following claims is susceptible of a variety of embodiments and is not limited or restricted to the present preferred embodiment illustrated and described in detail.

We claim:

1. In a jack, the combination of a frame, a load lifting and lowering beam hinged on said frame, means to raise and lower said beam step-by-step including an operating-handle, and manually-operated means to lock said handle and beam together temporarily to permit the latter to be raised quickly to the load by movement of the handle without resorting to the step-by-step mechanism.

2. In a jack, the combination of a frame, carrying-wheel means near one end only of said frame, the opposite end of the latter being adapted to rest on the floor, a load lifting and lowering beam hinged on said frame, means to raise and lower said beam step-by-step including an operating-handle, and manually-operated means to selectively lock said frame and beam together temporarily whereby the handle may rock the frame about the axis of said carrying-wheel means or lock said handle and beam together to permit the former to raise the latter quickly to the load without recourse to said step-by-step mechanism.

3. In a jack, the combination of a frame, carrying-wheel means therefor near one end only of the frame, the opposite end of the latter being adapted to rest on the floor, a load lifting and lowering beam hinged on said frame, means to raise and lower said beam step-by-step including an operating-handle, a double-tooth latch hinged on said handle to swing in opposite directions to selectively engage said beam or said frame, and means actuated by the operator to swing said latch in either direction, whereby when said handle is latched to said beam the latter may be swung upwardly without resorting to the step-by step mechanism and when said handle is latched to said frame the latter may be rocked up around the axis of said carrying-wheel means.

4. In a jack, the combination of a supporting-frame having a stationary ratchet-bar rigid therewith, a load lifting and lowering beam hinged on said frame, an operating-handle hinged on said beam, double-pawl means on said handle cooperating with said ratchet-bar, and means controlling the action of said pawl means to permit the elevation and descent of said beam step-by-step by the oscillation of said handle.

5. In a jack, the combination of a supporting-frame having transversely-spaced registering ratchet-bars, a load lifting and lowering beam hinged on said frame and adapted to rock between said ratchet-bars, an operating-handle hinged on said beam, pawls on said handle of a width to simultaneously cooperate with the teeth of both ratchet-bars, and means controlling the action of said pawls to permit the elevation and descent of said beam step-by-step by the oscillation of said handle.

6. In a jack, the combination of a frame having transversely-spaced ratchet-bars each with front and rear teeth in register with the corresponding teeth of the companion ratchet-bar, a load lifting and lowering beam hinged on said frame to rock between said ratchet-bars, an operating-handle fulcrumed on said beam, a front pawl hinged on said handle and of a width to co-operate with the front teeth of both ratchet-bars, a rear pawl hinged on said handle of a width to coact with the rear teeth of both ratchet-bars, and means controlling the action of said pawls to permit the oscillation of said handle to selectively raise or lower said beam step-by-step.

7. In a jack, the combination of a supporting-frame having transversely-spaced ratchet-bars each with front and rear teeth in register with the coresponding teeth of the companion ratchet-bar, a load lifting and lowering beam hinged on said frame to rock vertically between said ratchet-bars, an operating-handle fulcrumed on said beam, a front pawl hinged on said handle coaxially with said handle fulcrum and of a width to co-operate simultaneously with the front teeth of both ratchet-bars, a rear pawl hinged on said handle and of a width to co-operate simultaneously with the rear teeth of both ratchet-bars, an arm hinged to one of said pawls, a link connecting said arm to the other pawl, a spring, and means under the control of the operator to selectively cause said spring to apply its tension to said arm tending to separate the pawls or to apply its compression to said arm tending to cause said pawls to approach one another and the intervening ratchet-bars, a spring-pressed plunger on each of said pawls, and abutments on said handle co-operating with said plungers, whereby said beam may be raised or lowered step-by-step by the vertical rocking movements of said handle.

8. In a jack, the combination of a frame, a load lifting and lowering beam hinged on said frame, two stationary ratchets on said frame, an operating-handle fulcrumed on said beam, a pair of pawls cooperating with said ratchets, means connecting said pawls together, and spring means operating on said connecting means and adapted to apply spring tension or spring compression on said connecting means, whereby to permit said beam to be raised or lowered step-by-step.

9. In a jack, the combination of a supporting-frame, carrying-wheel means therefor near one end thereof, the other end of such frame having a foot adapted to rest on the floor, a beam hinged to said frame near its carrying-wheel means end, a load-engaging saddle on said beam near the foot end of said frame, an operating-handle fulcrumed on the jack and projecting longitudinally of said frame beyond the end equipped with said carrying-wheel means, operating means connecting said handle and beam, whereby the load may be raised or lowered, and manually-actuated means to lock said handle to said frame permitting said handle when depressed to rock said frame around the axis of said carrying-wheel means to raise said frame foot from the floor to permit travel of the jack on said carrying-wheel means only.

In witness whereof we have hereunto set our hands.

GAILARD E. WEAVER.
EDWARD W. KELLEY.